US012017795B2

(12) United States Patent
Wong

(10) Patent No.: US 12,017,795 B2
(45) Date of Patent: Jun. 25, 2024

(54) UNMANNED AERIAL VEHICLE LAUNCH AND RECOVERY

(71) Applicant: The Boeing Company, Chicago, IL (US)

(72) Inventor: John Wong, Klickitat, WA (US)

(73) Assignee: The Boeing Company, Arlington, VA (US)

( * ) Notice: Subject to any disclaimer, the term of this patent is extended or adjusted under 35 U.S.C. 154(b) by 190 days.

(21) Appl. No.: 17/720,975

(22) Filed: Apr. 14, 2022

(65) Prior Publication Data

US 2023/0331398 A1    Oct. 19, 2023

(51) Int. Cl.
*B64F 1/02* (2006.01)
*B64C 39/02* (2023.01)
*B64C 29/00* (2006.01)
*B64U 80/84* (2023.01)

(52) U.S. Cl.
CPC ............ *B64F 1/029* (2020.01); *B64C 39/024* (2013.01); *B64C 29/00* (2013.01); *B64U 80/84* (2023.01)

(58) Field of Classification Search
CPC ....... B64F 1/029; B64C 39/024; B64C 29/00; B64U 80/84; B64U 70/00
See application file for complete search history.

(56) References Cited

U.S. PATENT DOCUMENTS

| 8,172,177 B2* | 5/2012 | Lovell ..................... B63B 27/10 |
| | | 244/110 F |
| 9,434,481 B2* | 9/2016 | McGeer ................. B64U 80/20 |
| 2012/0223182 A1 | 9/2012 | Gilchrist, III et al. |
| 2020/0087004 A1 | 3/2020 | Wong |

* cited by examiner

*Primary Examiner* — Justin M Benedik
(74) *Attorney, Agent, or Firm* — HANLEY, FLIGHT & ZIMMERMAN, LLC

(57) ABSTRACT

Unmanned aerial vehicle (UAV) launch and recovery is disclosed. A disclosed example apparatus for recovering a UAV includes a base to be mounted to a recovery vehicle, a flexible arm extending from the base to pivot therefrom, the arm having a first end at the base and a second end opposite the first end, the arm to move to counteract a movement of the recovery vehicle, and a coupler mounted on or proximate the second end of the arm, the coupler to be releasably coupled to the UAV.

21 Claims, 9 Drawing Sheets

UNMANNED AERIAL VEHICLE LAUNCH AND RECOVERY

FIELD OF THE DISCLOSURE

This disclosure relates generally to aircraft and, more particularly, to unmanned aerial vehicle launch and recovery.

BACKGROUND

In recent years, unmanned aerial vehicles (UAVs) or drones have been used to fly significant distances to transport payloads (e.g., packages, supplies, equipment, etc.) or gather information. Some UAVs land on runways while others are captured in flight by UAV recovery systems.

SUMMARY

An example apparatus for recovering an unmanned aerial vehicle (UAV) includes a base to be mounted to a recovery vehicle, an arm extending from the base to pivot therefrom, the arm having a first end at the base and a second end opposite the first end, the arm to move to counteract a movement of the recovery vehicle, and a coupler mounted on or proximate the second end of the arm, the coupler to be releasably coupled to the UAV.

An example method of recovering a UAV includes moving, in response to a movement of a recovery vehicle, an arm that pivots from a base fixed to the recovery vehicle to counteract the movement of the recovery vehicle, the arm having a distal end supporting a first coupler, and extending the arm toward the UAV as the UAV hovers to bring the first coupler in proximity of a second coupler carried by the UAV, the first coupler to be coupled to the second coupler to couple the UAV to the arm.

An example non-transitory computer readable medium includes instructions, which when executed, cause processor circuitry to determine a movement of a recovery vehicle carrying an arm for recovery of a UAV, the arm to pivot relative to the recovery vehicle, calculate a counteracting movement of the arm based on the measured movement of the recovery vessel, and control an actuator to move the arm based on the counteracting movement to bring a first coupler of the arm to a second coupler of the UAV to capture the UAV.

Figure 1:
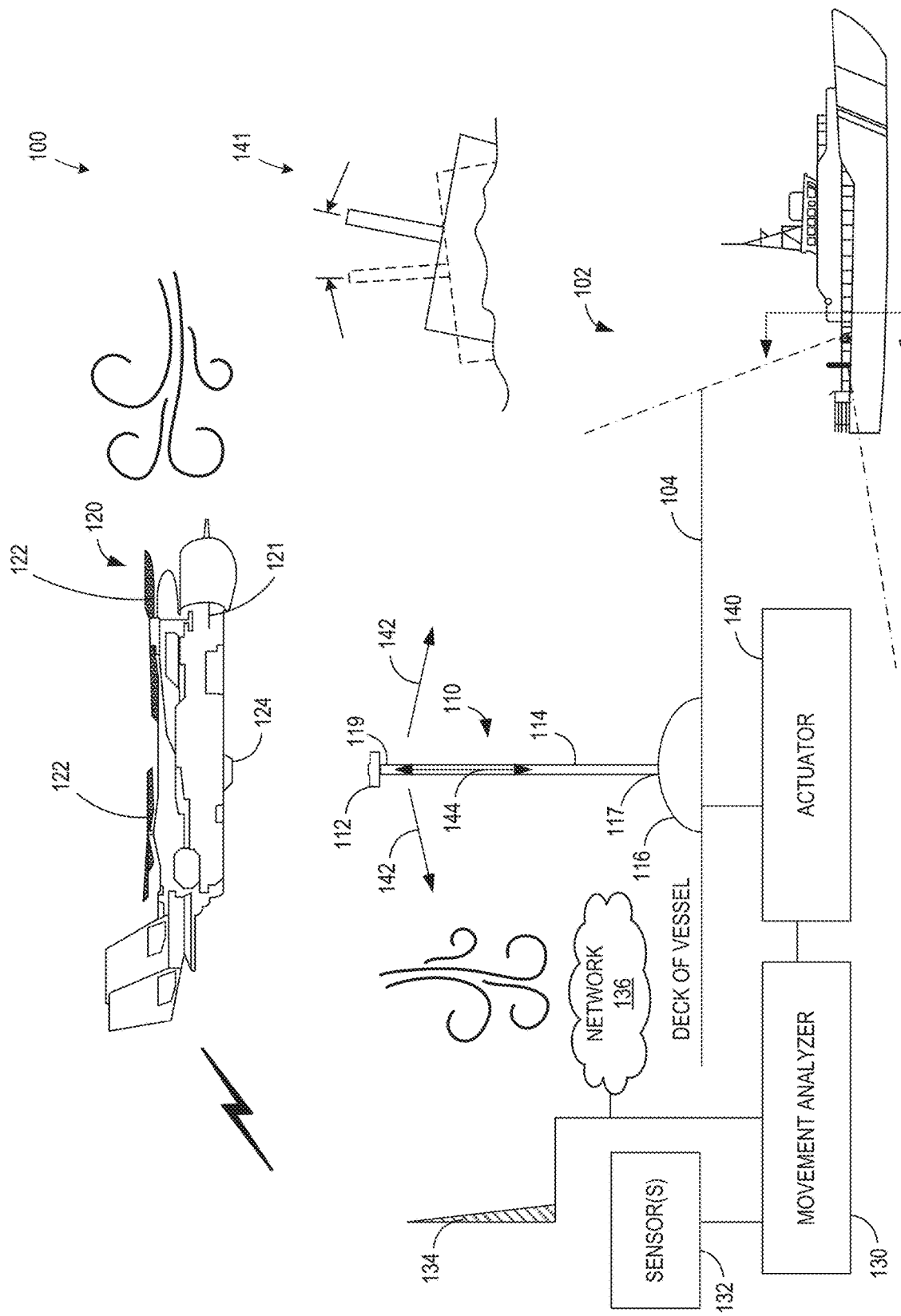
FIG. 1 illustrates an example unmanned aerial vehicle (UAV) launch and recovery system in accordance with the teachings of this disclosure.

In general, the same reference numbers will be used throughout the drawing(s) and accompanying written description to refer to the same or like parts. The figures are not to scale. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part a is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time +/−1 second.

As used herein, the phrase "in communication," including variations thereof, encompasses direct communication and/ or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Unmanned aerial vehicle (UAV) launch and recovery is disclosed. Some known UAV recovery systems can necessitate relatively large mechanisms that can add significant weight for recovery vehicles that carry these systems. These known systems can also require complex guidance and coordination systems to enable a UAV to be recovered when a recovery vehicle, such as a sea-faring vessel, experiences significant motion (e.g., motion pertaining to pitch, roll, etc.). Additionally, such motion can increase a time for the UAV to be recovered by the recovery vehicle. Even further, the unstable landing area of recovery vehicles can lead to destabilized landings, which can damage a UAV.

Recently, to enhance the capabilities of a UAV, fixed-wing flight has been combined with the capability for vertical takeoff and landing (VTOL). A fixed-wing UAV has the advantage of a relatively long flight/mission time while the VTOL capability allows the UAV to be deployed without necessitating a runway for takeoff and landing. Landing and takeoff of a fixed-wing VTOL UAV on level ground can be relatively simple since the ground does not move. However, takeoff and landing a fixed-wing VTOL UAV on a ship presents unique challenges. For example, on a ship, a deck may have significant motion due to waves and may also experience strong winds, all of which reduce or eliminate a stable surface for the UAV to takeoff from and land. Further, the strong winds may cause improper operation of the UAV attempting to takeoff and land. Even further, ground effects resulting from vertical lift thrust may create turbulence which, in turn, can contribute to the instability caused by winds. Foul weather may also cause the fixed-wing VTOL UAV to impact the deck of the ship and damage the fixed-wing VTOL UAV.

Examples disclosed herein enable an accurate, lightweight, compact and relatively low cost recovery/launch of an aircraft (e.g., a UAV, a fixed-wing VTOL UAV) with a moving vehicle. In particular, examples disclosed herein enable the aircraft to be recovered by accommodating motion of the recovery vehicle, thereby enabling the aircraft to be quickly recovered with relative ease. Further, examples disclosed herein do no necessitate relatively large equipment for launching and capturing a fixed-wing UAV. In particular, examples disclosed herein can be more portable than known UAV recovery systems, which utilize large components to dissipate forces from capturing UAVs. Examples disclosed herein can be implemented on existing UAVs as a retrofit capture implementation (e.g., via an upgrade kit).

Examples disclosed herein can decouple motion of a deck of a ship and stability of a UAV, thereby enabling the UAV to be captured so that the UAV can be securely held and brought down to the deck without damage thereto. Examples disclosed herein can also enable capture of the UAV at a position that is not directly on the deck of a ship. In scenarios with relatively small ships and boats that typically may not have enough deck space to recover a UAV, examples disclosed herein can enable an offset capture location to facilitate capture of the UAV thereon.

Examples disclosed herein utilize a support mount (e.g., a pole, an articulated pole, an extension, etc.) that extends from a vehicle that is moving or stationary (e.g. a maritime vessel, etc.). In particular, during recovery of an aircraft by the vehicle, a flexible arm of the support mount can articulate, pivot, extend and/or move relative to the vehicle to counteract a movement (e.g., a swaying, pitching and/or rolling motion of the vehicle). As a result, a coupler (e.g., a coupler supporting a rare earth magnet) attached to the support mount can be used to couple the aircraft to the support mount. According to examples disclosed herein, the aircraft can be hovering above (or to the side in other implementations) the support mount such that the support mount is extended longitudinally to couple the support mount to the aircraft. As a result, the aircraft can be recovered with relative ease as the support mount counteracts movement of the vehicle with minimal or negligible impact forces are applied to the aircraft.

In some examples, an actuator (e.g., a two-axis actuator, a three-axis actuator, etc.) is used to pivot, telescopically displace and/or rotate the support mount towards the aircraft as the vehicle moves. In such examples, a coordinated movement of the actuator with the aircraft can be implemented to accommodate for motion of the vehicle. In other examples, a person or operator being transported by the vehicle pivots and/or extends (e.g., telescopically extends) the support mount toward the aircraft as the aircraft is being recovered.

As used herein, the terms "arm" or "flexible arm" refer to an extension or structure, such as a pole or arm, for example, that extends away from a body or a deck of a vehicle for the purposes of recovering another vehicle. As used herein, the term "coupler" refers to a device, component and/or assembly utilized to facilitate coupling between at least two objects and/or components. As used herein, the terms "telescoping," "telescopic stem," "telescoping tube" or "telescopic tube" refer to a structure, such as a collapsing/telescoping pole, in which a longitudinal length thereof can be adjusted.

FIG. 1 illustrates a UAV launch and recovery system 100 in accordance with the teachings of this disclosure. The UAV launch and recovery system 100 of the illustrated example includes a vehicle (e.g., a launch and recovery vehicle, a recovery vehicle, etc.) 102, which is implemented as a ship with a deck 104, for example. In this example, a support mount (e.g., an aircraft recovery support mount) 110 is mounted to and/or extends from the aforementioned deck 104. In the illustrated example, the support mount 110 includes a coupler 112, an arm (e.g., a support arm, a flexible arm, a compliant pole, etc.) 114 that is opposite the first end, and a base 116 that positions the support mount 110 relative to the deck 104. In this example, the arm 114 includes a first proximal end 117 at the base 116, as well as a second distal end 119 (opposite the first proximal end 117) supporting the coupler 112.

In the illustrated example of FIG. 1, an aircraft 120, which is launched from and recovered by the support mount 110, is implemented as a UAV, which can be implemented as a vertical takeoff and landing (VTOL) aircraft or a short takeoff and landing (STOL) aircraft. In turn, the example aircraft 120 includes a fuselage 121, rotors 122, as well as a coupler (e.g., a docking plate, a steel plate, a metal disc, etc.) 124. In some other examples, the aircraft 120 is implemented as a quadcopter.

According to some examples disclosed herein, the UAV launch and recovery system 100 includes a movement analyzer 130, which may be communicatively coupled to at least one sensor 132. In some examples, the UAV launch and recovery system 100 also includes a transceiver 134 that is communicatively coupled to a network 136. Additionally or alternatively, the example UAV launch and recovery system 100 includes an actuator (e.g., a rotational actuator, a three-axis actuator, a two-axis actuator, etc.) 140.

To facilitate recovery of the aircraft 120 as the aircraft 120 hovers relatively close to the support mount 110, the support mount 110 is moved (e.g., pivoted, swayed, etc.) to counteract a movement of the vehicle 102 that can cause considerable displacement of the distal end 119 of the support mount 110 (e.g., movement caused by waves, rocking and/or swaying of the vehicle 102 as the vehicle 102 floats on a body of fluid/water), which is generally illustrated by a view 141 in FIG. 1. In particular, the arm 114 is generally flexible (e.g., flexible, semi-rigid, etc.) and caused to sway against a movement of the vehicle 102, as generally indicated by arrows 142, so that the arm 114 is held relatively stable so that the coupler 112 of the support mount 110 can attract and be coupled (e.g., releasably coupled) to the coupler 124 of aircraft 120 while the vehicle 102 moves. In some examples, the arm 114 and/or the support mount 110 is telescopic such that the arm 114 can expand or contract along a longitudinal direction of the arm 114, which is generally indicated by a double arrow 144. In some such examples, an operator (e.g., a person on the deck 104) can extend the support mount 110 to contact the aircraft 120 as the aircraft 120 moves in close proximity to the vehicle 102. In other words, the support mount 110 can be moved toward the aircraft 120 based on operator adjustments. Additionally or alternatively, the operator can sway and/or pivot the generally flexible arm 114 and/or the support mount 110 to counteract and/or accommodate a motion of the deck 104 and/or the vehicle 102. In one example, an actuator 140 that can pivot the arm 114 can be controlled by the operator to move and/or sway the distal end 119 having the support mount 110 based on observed movement of the vehicle 102 to counteract the sway of the vehicle 102 (e.g. ship pitching back and forth) to maintain the distal end 119 and the support mount 110 within a nominal range or proximity of an aircraft 120 hovering above the support mount 110, thereby stabilizing the support mount 110 relative to the vehicle 102 and mitigating the motion of the vehicle 102 such that the coupler 112 can engage the coupler 124 on the aircraft 120 to facilitate docking and recovery of the aircraft. Once the coupler 112 is coupled to the coupler 123 on the hovering aircraft, at least a portion of the arm 114 (e.g. the proximal end portion) is sufficiently flexible such that propulsion forces generated by the docked aircraft that is still hovering in place cause the arm 114 to bend or flex relative to the base 116 to mitigate transfer of movement of the vehicle via the support mount 110 to the docked hovering aircraft, to better enable the aircraft to be safely lowered and recovered.

To control movement of the support mount 110 for recovery (or launch) of the aircraft 120, in some examples, sensor output and/or data of the sensor(s) 132 is utilized to measure a movement of the vehicle 102 (e.g., a sway of the vehicle 102 caused by waves, conditions proximate the aircraft 120 and/or the vehicle 102). In such examples, the movement analyzer 130 can be implemented to calculate a counteracting movement of the support mount 110 and/or the arm 114. In turn, the actuator 140 can be controlled to move and/or sway the support mount 110 based on the calculated counteractive movement, thereby stabilizing the support mount 110 relative to the vehicle 102 despite motion of the vehicle 102. As a result of mitigating the motion of the vehicle 102, the coupler 112 can couple to the coupler 124. In particular, the coupler 112 can include a magnet to attract the coupler 124. In some examples, movement of the support mount 110 is at least partially based on measurements of wind conditions (e.g., wind conditions proximate the aircraft 120, the support mount 110 and/or the vehicle 102) measured by the sensor(s) 132.

According to some examples disclosed herein, to coordinate movement (e.g., hovering) of the aircraft 120 relative to the vehicle 102, the transceiver 134 is communicatively coupled (e.g., in wireless communication) with both the aircraft 120 and the vehicle 102. In particular, the transceiver 134 receives position/movement data from the aircraft 120 and the vehicle 102, and forwards this position/movement data to the network 136 and/or the movement analyzer 130. In turn, the network 136 and/or the movement analyzer 130 sends movement commands, via the transceiver 134, to direct movement of the aircraft 120 and/or the vehicle 102 so that the aircraft 120 can hover above the support mount 110 to cause the coupler 112 and the coupler 124 to be brought in relatively close proximity of one another. In some examples, global positioning system (GPS) data is used to coordinate relative movement between the aircraft 120 and the vehicle 102.

In some examples, at least a portion of the arm 114 includes a bendable/flexible element, where upon engagement of the aircraft 120 to the support mount 110, the bendable element enables the arm 114 to bend relative to the proximal end 117 at the base 116, thereby mitigating and/or reducing transfer of ship movements to the aircraft 120 engaged to the support mount 110. In some such examples, the bendable element includes sufficient elasticity to permit bending of the pole responsive to propulsion forces generated by the aircraft 120 (e.g., forces typically caused by hovering) when the aircraft 120 is engaged to the support mount 110 to improve stability of the aircraft 120. In some examples, the bendable element includes sufficient stiffness to resist bending of the arm 114 caused primarily by a weight of a non-operating UAV engaged thereto.

In some examples, a lock 210 (shown in FIG. 2A) or other locking mechanism can be implemented to secure the coupler 112 to the coupler 124 and, in turn, the aircraft 120. In some such examples, the lock 210 can be utilized to push the coupler 124 and/or the aircraft 120 away from the coupler 112 (e.g., via a movable pin, etc.). In some examples, the coupler 112 is generally disc-shaped or includes a generally flat surface to contact the coupler 124, which may include a complementary and/or flat surface.

While the vehicle 102 is shown implemented as a ship (e.g., a marine vessel, a boat, a maritime vessel, etc.) in this example, the vehicle 102 can be implemented as, but is not limited to, a ground vehicle, an automobile, a fixed wing aircraft, a rotorcraft, another UAV, a boat, a ship, a submarine, a quadcopter, a spacecraft, etc. As mentioned above, examples disclosed herein can also be utilized for launch of the aircraft 120 such that the aircraft 120 is stabilized by the support mount 110 when being launched.

Figure 2A:
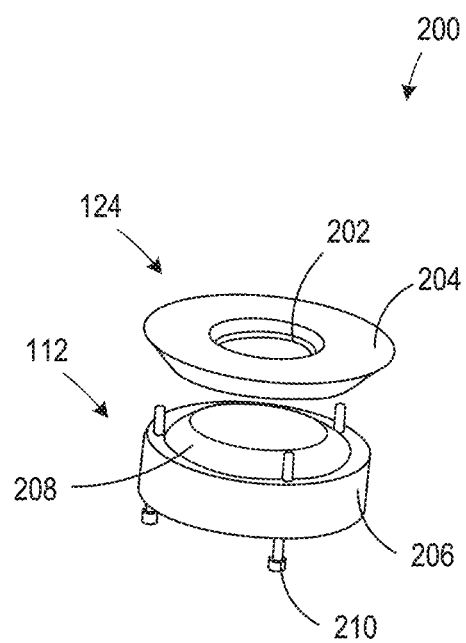
FIGS. 2A and 2B are detailed views of example coupling systems that can be implemented in examples disclosed herein.
Figure 2B:
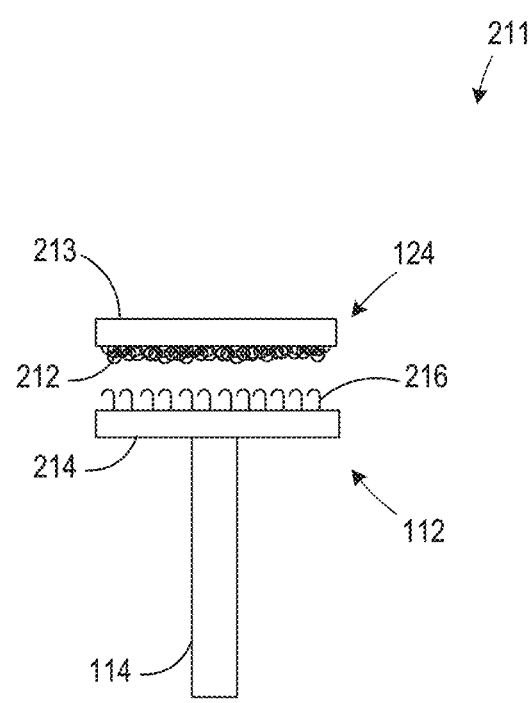

FIGS. 2A and 2B are detailed views of example coupling systems that can be implemented in examples disclosed herein. Turning to FIG. 2A, an example coupling system 200, which is self-centering, is shown. In this example, the coupler 124 shown in FIG. 1 includes a contoured inner ring surface 202 with an annular body 204. Further, the coupler 112 also shown in FIG. 1 includes a cylindrical body 206 that supports and/or carries a contoured protrusion 208.

In operation, the annular body is at least partially composed of metal (e.g., steel) while at least one of the contoured protrusion 208 and/or the cylindrical body includes a magnet (e.g., a rare earth magnet). Accordingly, during mating of the coupler 124 to the coupler 112, an interaction between a shape of the contoured protrusion 208 and a shape of the inner ring surface 202 guides a relative positioning between the coupler 112 and the coupler 124. In other words, shapes of the inner ring surface 202 and the contoured protrusion 208 enable the coupler 112 and the coupler 124 to be aligned to one another. As mentioned above in connection with FIG. 1, the lock 210 can be implemented to secure the coupler 112 to the coupler 124. In some such examples, the lock 210 can be implemented to push the aircraft 120 away during launch thereof (e.g., with a moving and/or actuated pin).

Turning to FIG. 2B, an example coupling system 211 is shown. In this example, a hook and loop mating system (e.g., a Velcro® interface) is utilized such that a first part 212 of the hook and loop mating system is supported by a first body 213 of the coupler 124. Further, a body 214 of the coupler 112, which is supported by the arm 114 (e.g., the arm 114 acts a stabilization pole), positions a second part 216 of the hook and loop mating system.

Figure 3A:
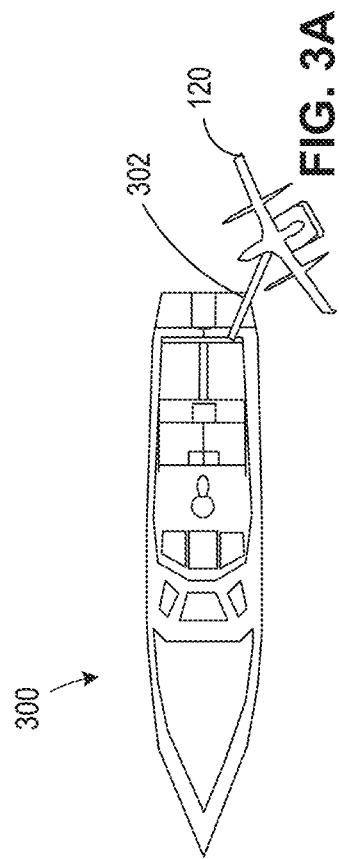
FIGS. 3A and 3B illustrate example launch/recovery implementations of examples disclosed herein.
Figure 3B:
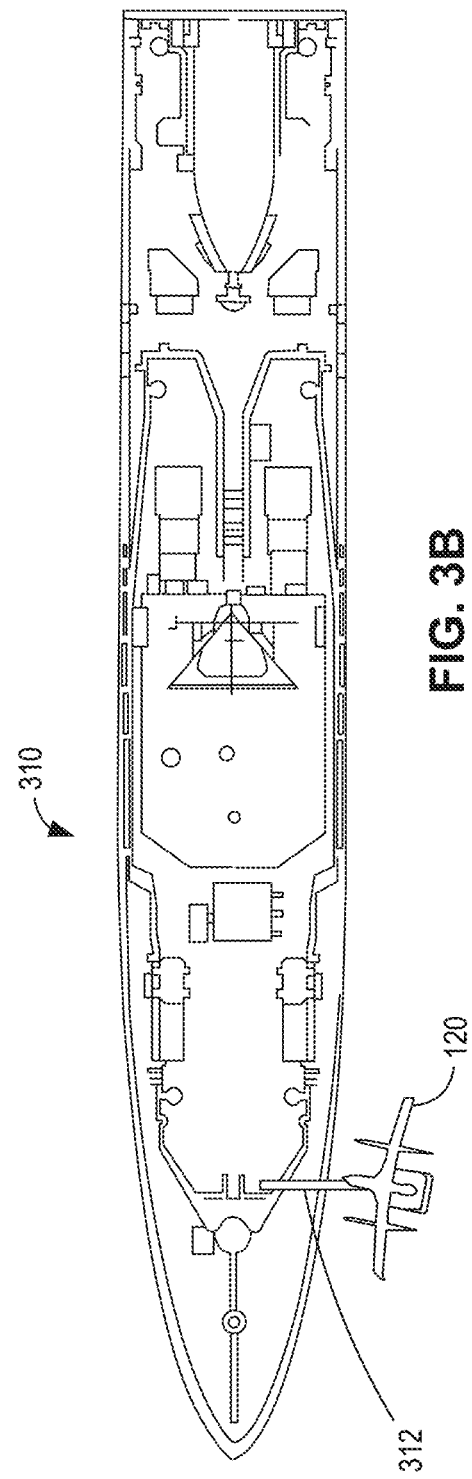

FIGS. 3A and 3B illustrate example launch/recovery implementations of examples disclosed herein. In contrast to the example shown in FIG. 1 in which the aircraft 120 is recovered on the deck 104, FIGS. 3A and 3B depicts launch/recovery of a UAV at a distance from a deck. Turning to FIG. 3A, a vessel 300 supports a swing arm 302, which functions as a swingable (e.g., laterally movable) and retractable/extendible boom for capturing the aircraft 120. In other words, examples disclosed herein can also swing and/or rotate in a lateral direction away from a body of a recovery vehicle. In this example, the swing arm 302 is positioned at an aft side of the vessel 300.

FIG. 3B is similar to the example of FIG. 3A but, instead, depicts a vessel 310 supporting a swing arm 312 to launch/recover the aircraft 120 at a fore end of the vessel 310. In this example, the swing arm 312 is rotatable relative to the vessel 310 and can be telescopically adjusted.

Figure 4:
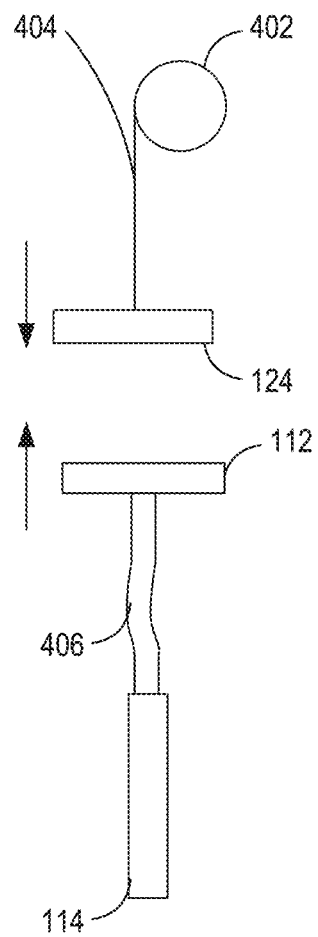
FIG. 4 illustrates an example mating assist that can be implemented in examples disclosed herein.

FIG. 4 illustrates an example mating assist that can be implemented in examples disclosed herein. In the illustrated example of FIG. 4, a winch 402 can support a line 404 that carries the coupler 124. In this example, the winch 402 can lower or raise the coupler 124. Further, the arm 114 carries a cable (e.g., a semi-rigid cable, a rigid cable, etc.) 406 that can be extended and/or manipulated to facilitate bringing the coupler 112 and the coupler 124 together.

Figure 5:
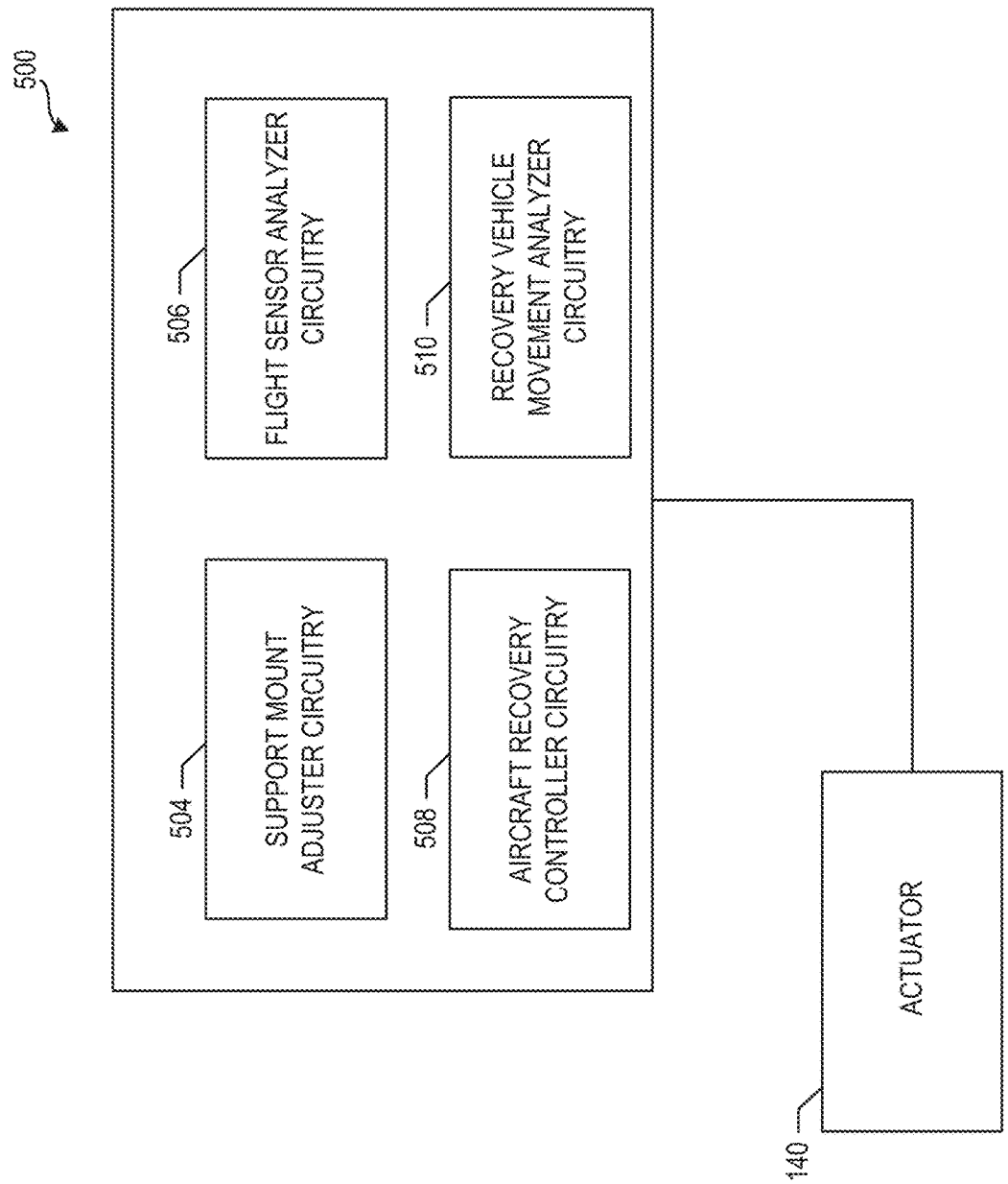
FIG. 5 is a schematic overview of an example aircraft recovery control system that can be implemented in examples disclosed herein.

FIG. 5 is a block diagram of an example aircraft recovery control system 500 to recover and/or launch the aircraft 120. The example aircraft recovery control system 500 of FIG. 5 may be instantiated (e.g., creating an instance of, bring into being for any length of time, materialize, implement, etc.) by processor circuitry such as a central processing unit executing instructions. Additionally or alternatively, the example aircraft recovery control system 500 of FIG. 5 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 5 may, thus, be instantiated at the same or different times. Some or all of the circuitry may be instantiated, for example, in one or more threads executing concurrently on hardware and/or in series on hardware. Moreover, in some examples, some or all of the circuitry of FIG. 5 may be implemented by one or more virtual machines and/or containers executing on the microprocessor.

The example aircraft recovery control system 500 includes example support mount adjuster circuitry 504, example flight sensor analyzer circuitry 506, example aircraft recovery controller circuitry 508 and example recovery vehicle movement analyzer circuitry 510. In some examples, the aircraft recovery control system 500 includes and/or is communicatively coupled to the actuator 140.

The support mount adjuster circuitry 504 of the illustrated example is implemented to determine a degree of adjustment of the support mount 110 so that the coupler 112 of the support mount 110 is maintained at and/or moved to a position within a minimum requisite distance of the coupler 124 of the aircraft 120. In this example, the degree of adjustment of the support mount 110 is based on a measured movement (e.g., a sway) of the vehicle 102 determined by the example recovery vehicle movement analyzer circuitry 510. The support mount adjuster circuitry 504 can control a sway and/or extension of the support mount 110 to counteract a movement (e.g., a rocking motion, a pitching motion, a rolling motion, etc.) of the vehicle 102. Additionally or alternatively, the support mount adjuster circuitry 504 controls a degree to which the support mount 110 is extended along a longitudinal direction thereof (e.g., a telescopic length of the support mount 110).

In some examples, the flight sensor analyzer circuitry 506 is implemented to analyze sensor data from the sensor(s) 132 and/or sensor(s) associated with the aircraft 120. The example flight sensor analyzer circuitry 506 can be used to determine a position of the aircraft 120 and/or wind conditions proximate the aircraft 120 (e.g., for movement of the support mount 110).

In some examples, the aircraft recovery controller circuitry 508 is utilized to control and/or coordinate movement of the aircraft 120 relative to the vehicle 102. In some such examples, the aircraft recovery controller circuitry 508 directs the aircraft 120 toward a vicinity of the support mount 110 so that the aircraft 120 can hover generally above the support mount 110.

The example recovery vehicle movement analyzer circuitry 510 determines a motion and/or movement of the vehicle 102. In some examples, the movement analyzer circuitry 510 determines a swaying, pitching or rocking motion of the vehicle 102 so that the support mount 110 can be moved to counteract it. Additionally or alternatively, a motion of the aircraft 120 is utilized to determine a relative motion between the aircraft 120 and the vehicle 102 for determination of a counteracting motion of the support mount 110.

While an example manner of implementing the example aircraft recovery control system 500 of FIG. 5 is illustrated in FIG. 5, one or more of the elements, processes, and/or devices illustrated in FIG. 5 may be combined, divided, re-arranged, omitted, eliminated, and/or implemented in any other way. Further, the example support mount adjuster circuitry 504, example flight sensor analyzer circuitry 506, example aircraft recovery controller circuitry 508 and recovery vessel movement analyzer circuitry 510, and/or, more generally, the example aircraft recovery control system 500 of FIG. 5, may be implemented by hardware alone or by hardware in combination with software and/or firmware. Thus, for example, any of the example support mount adjuster circuitry 504, example flight sensor analyzer circuitry 506, example aircraft recovery controller circuitry 508 and recovery vehicle movement analyzer circuitry 510 and/or, more generally, the example aircraft recovery control system 500, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example aircraft recovery control system 500 of FIG. 5 may include one or more elements, processes, and/or devices in addition to, or instead of, those illustrated in FIG. 5, and/or may include more than one of any or all of the illustrated elements, processes and devices.

Figure 6:
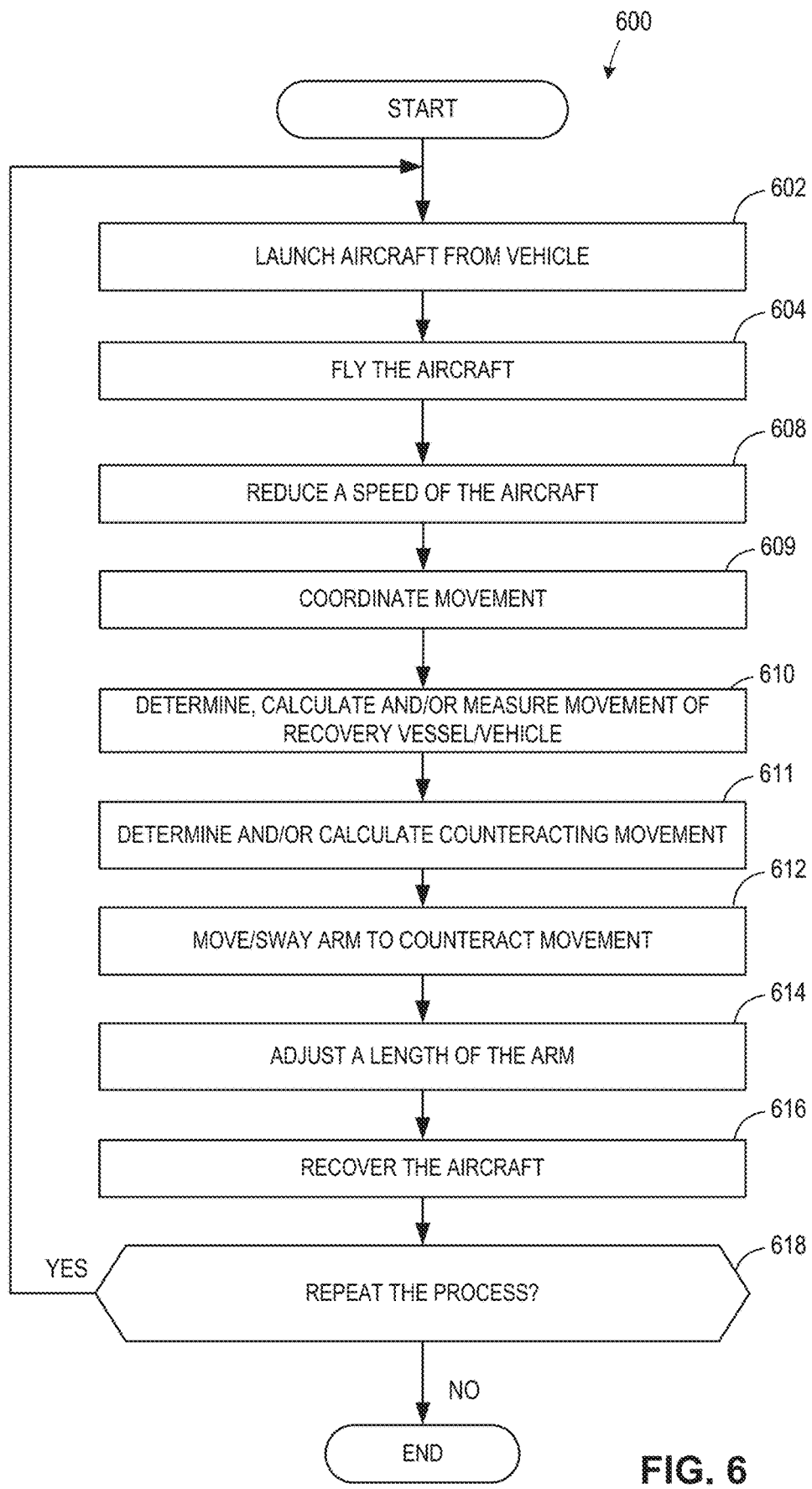
FIG. 6 is a flowchart representative of example machine readable instructions and/or example operations that may be executed by example processor circuitry to implement the example unmanned aerial vehicle (UAV) launch and recovery system of FIG. 1 and/or the example aircraft recovery control system of FIG. 5.

A flowchart representative of example hardware logic circuitry, machine readable instructions, hardware implemented state machines, and/or any combination thereof for implementing the aircraft recovery control system 500 of FIG. 5 is shown in FIG. 6. The machine readable instructions may be one or more executable programs or portion(s) of an executable program for execution by processor circuitry, such as the processor circuitry 712 shown in the example processor platform 700 discussed below in connection with FIG. 7 and/or the example processor circuitry discussed below in connection with FIGS. 8 and/or 9. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 6, many other methods of implementing the example aircraft recovery control system 500 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 6 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 6 is an example method 600 that can be implemented in examples disclosed herein. In this example, the aircraft 120 is to be launched and recovered by the vehicle 102. In this example, the aircraft 120 is a VTOL or STOL aircraft that can hover with a relatively limited degree of control.

At block 602, the aircraft 120 is launched from the vehicle 102. In this example, prior to launch, the aircraft 120 is held by the support mount 110 as the coupler 112 and the coupler 124 are held together. Further, the coupler 112 and the coupler 124 are disengaged or moved away from one another to enable the aircraft 120 to depart therefrom. In particular, the lock 210 can push the aircraft 120 away when the aircraft 120 is to be launched, for example.

At block 604, the aircraft 120 is flown (block 604). In some examples, the aircraft recovery controller circuitry 508 controls flight of the aircraft 120 (e.g., based on data from the flight sensor analyzer circuitry 506) and further directs and/or navigates the aircraft 120 to be moved in proximity of the support mount 110 once the aircraft 120 completes a mission.

At block 608, in some examples, a speed of the vehicle 102 is reduced prior to recovering the aircraft 120. In such examples, the aircraft recovery controller circuitry 508 can direct the aircraft 120 to reduce its speed and hover proximate the support mount 110 by utilizing data from the flight sensor analyzer circuitry 506.

At block 609, in some examples, the aircraft recovery controller circuitry 508 coordinates movement of the aircraft 120 with the vehicle 102. For example, the aircraft recovery controller circuitry 508 directs the aircraft 120 to match a motion (e.g., a rolling motion, a swaying motion, a pitching motion, etc.) of the aircraft 120 when the aircraft 120 comes within a defined range (e.g., a defined range threshold) of the support mount 110.

At block 610, the recovery vehicle movement analyzer circuitry 510 determines, calculates and/or measures movement of the vehicle 102. For example, the recovery vehicle movement analyzer circuitry 510 utilizes data from the sensor(s) 132. In some examples, the recovery vehicle movement analyzer circuitry 510 determines a movement of fluid on which the vehicle 102 floats. In some examples, the recovery vehicle movement analyzer circuitry 510 determines a motion of the vehicle 102 pertaining to waves and/or fluid on which the vehicle 102 floats. Additionally or alternatively, the flight sensor analyzer circuitry 506 determines and/or calculates a motion of the aircraft 120 in combination with the vehicle 102 for recovery of the aircraft 120.

At block 611, in some examples, the aircraft recovery controller circuitry 508 and/or the support mount adjuster 504 calculates and/or determines a counteracting movement of the arm 114. The counteracting movement can be calculated to mitigate any sudden movements of the vehicle 102, for example. In other words, acceleration of the vehicle 102 can be mitigated, for example. In some examples, the counteracting movement is calculated and/or determined to maintain a first mating surface of the coupler 112 to be relatively horizontal to a second mating surface of the coupler 124 (e.g., within 5 degrees).

At block 612, the example support mount adjuster 504 directs and/or causes the support mount 110 to move, rotate, swing and/or sway toward the aircraft 120 to counteract the movement of the vehicle 102. In some examples, the support mount adjuster 504 causes the actuator 140 to angle, pivot, and/or translate the arm 114 and, thus, the coupler 112 toward the coupler 124 of the aircraft 120 based on the aforementioned determined movement of the vehicle 102, thereby enabling a relative quick and easy recovery of the vehicle 102.

At block 614, In some examples, a length of the arm 114 is adjusted. For example, the arm 114 is longitudinally extended toward the aircraft 120 (e.g., via the actuator 140 or by an operator on the deck 104). In some such examples, the support mount adjuster 504 causes the arm 114 to longitudinally extend (e.g., via the actuator 140). In some examples, the arm 114 of the support mount 110 is extended by an operator on the deck 104. In some such examples, the operator is prompted (e.g., provided with a visual indication) to extend the arm 114 of the support mount 110 toward the aircraft 120 (e.g., based on a proximity of the aircraft 120 to the support mount 110). Additionally or alternatively, an electromagnet is employed to draw the coupler 124 to the coupler 112.

At block 616, the aircraft 120 is recovered by the vehicle 102. In some examples, a height from the deck and/or a length of the arm 114 is reduced to bring the aircraft 120 closer to the deck 104 of the vehicle 102. In some examples, data from the flight sensor analyzer circuitry 506 is utilized to determine a degree to which the height from the deck and/or the length is to be adjusted.

At block 618, it is then determined whether to repeat the process. If the process is to be repeated, control of the process returns to block 602. Otherwise, the process ends. This determination may be based on whether the aircraft 120 is to be re-launched or another aircraft is to be launched from the support mount 110.

Figure 7:
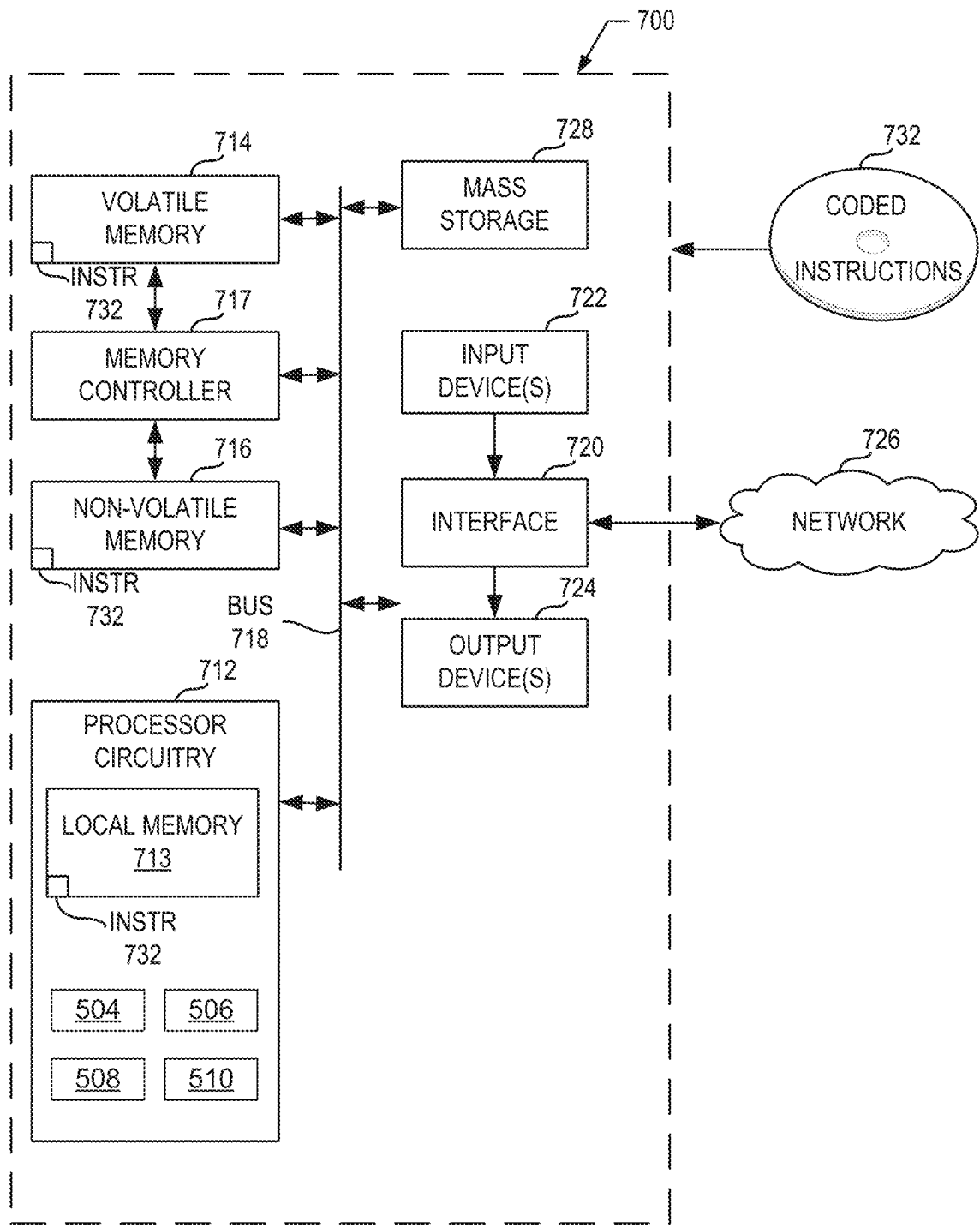
FIG. 7 is a block diagram of an example processing platform including processor circuitry structured to execute the example machine readable instructions and/or the example operations of FIG. 6 to implement the example unmanned aerial vehicle (UAV) launch and recovery system of FIG. 1 and/or the example aircraft recovery control system of FIG. 5.

FIG. 7 is a block diagram of an example processor platform 700 structured to execute and/or instantiate the machine readable instructions and/or the operations of FIG. 6 to implement the aircraft recovery control system 500 of FIG. 5. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 700 of the illustrated example includes processor circuitry 712. The processor circuitry 712 of the illustrated example is hardware. For example, the processor circuitry 712 can be implemented by one or more integrated circuits, logic circuits, FPGAs, microprocessors, CPUs, GPUs, DSPs, and/or microcontrollers from any desired family or manufacturer. The processor circuitry 712 may be implemented by one or more semiconductor based (e.g., silicon based) devices. In this example, the processor circuitry 712 implements the example support mount adjuster circuitry 504, the example flight sensor analyzer circuitry 506, the example aircraft recovery controller circuitry 508, and the example recovery vehicle movement analyzer circuitry 510.

The processor circuitry 712 of the illustrated example includes a local memory 713 (e.g., a cache, registers, etc.). The processor circuitry 712 of the illustrated example is in communication with a main memory including a volatile memory 714 and a non-volatile memory 716 by a bus 718.

The volatile memory 714 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 716 may be implemented by flash memory and/or any other desired type of memory device. Access to the main memory 714, 716 of the illustrated example is controlled by a memory controller 717.

The processor platform 700 of the illustrated example also includes interface circuitry 720. The interface circuitry 720 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 722 are connected to the interface circuitry 720. The input device(s) 722 permit(s) a user to enter data and/or commands into the processor circuitry 712. The input device(s) 722 can be implemented by, for example, an audio sensor, a microphone, a camera (still or video), a keyboard, a button, a mouse, a touchscreen, a track-pad, a trackball, an isopoint device, and/or a voice recognition system.

One or more output devices 724 are also connected to the interface circuitry 720 of the illustrated example. The output device(s) 724 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 720 of the illustrated example, thus, typically includes a graphics driver card, a graphics driver chip, and/or graphics processor circuitry such as a GPU.

The interface circuitry 720 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 726. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 700 of the illustrated example also includes one or more mass storage devices 728 to store software and/or data. Examples of such mass storage devices 728 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 732, which may be implemented by the machine readable instructions of FIG. 6, may be stored in the mass storage device 728, in the volatile memory 714, in the non-volatile memory 716, and/or on a removable non-transitory computer readable storage medium such as a CD or DVD.

Figure 8:
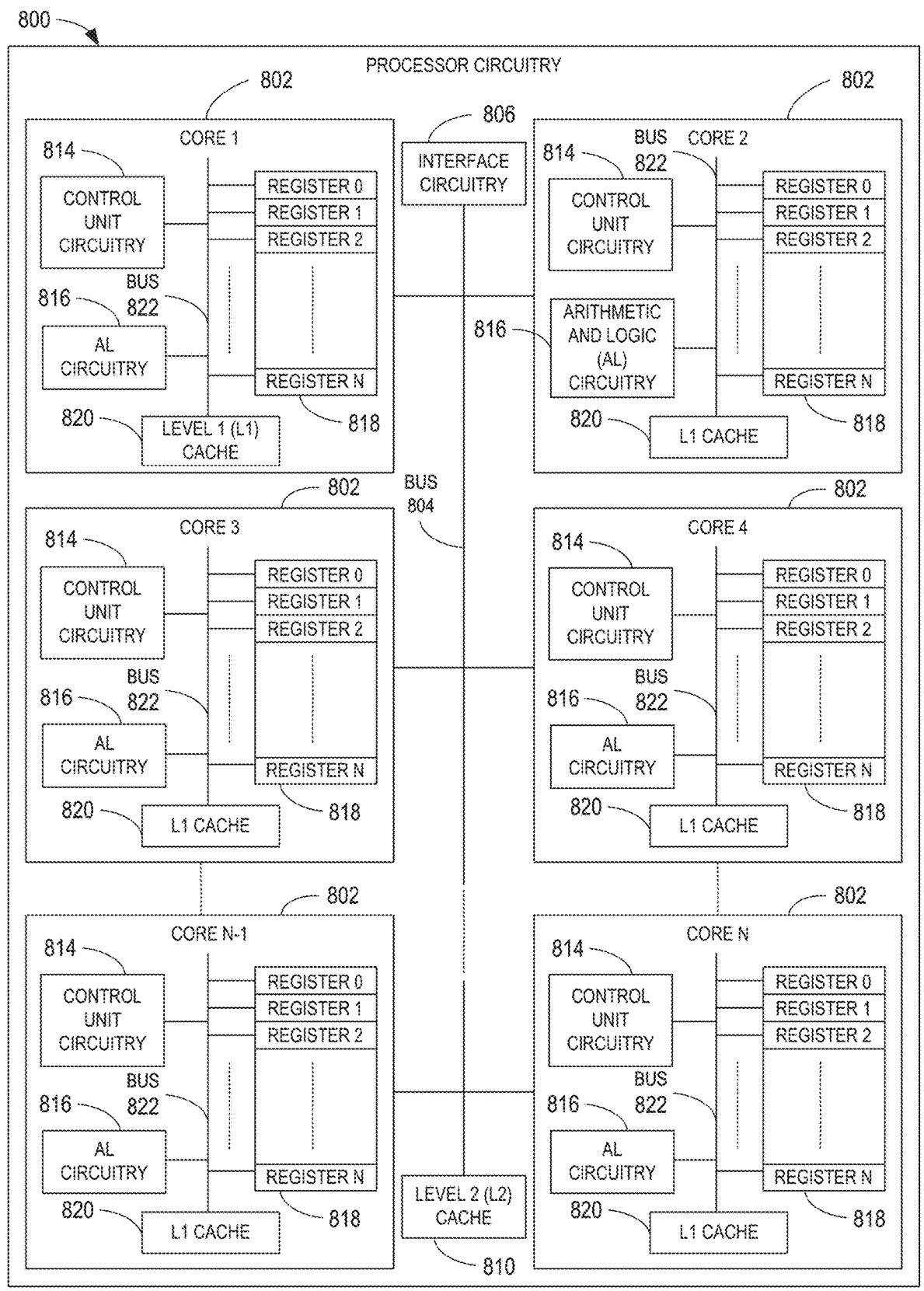
FIG. 8 is a block diagram of an example implementation of the processor circuitry of FIG. 7.

FIG. 8 is a block diagram of an example implementation of the processor circuitry 712 of FIG. 7. In this example, the processor circuitry 712 of FIG. 7 is implemented by a general purpose microprocessor 800. The general purpose microprocessor circuitry 800 executes some or all of the machine readable instructions of the flowchart of FIG. 6 to effectively instantiate the circuitry of FIG. 5 as logic circuits to perform the operations corresponding to those machine readable instructions. In some such examples, the circuitry of FIG. 5 is instantiated by the hardware circuits of the microprocessor 800 in combination with the instructions. For example, the microprocessor 800 may implement multi-core hardware circuitry such as a CPU, a DSP, a GPU, an XPU, etc. Although it may include any number of example cores 802 (e.g., 1 core), the microprocessor 800 of this example is a multi-core semiconductor device including N cores. The cores 802 of the microprocessor 800 may operate independently or may cooperate to execute machine readable instructions. For example, machine code corresponding to a firmware program, an embedded software program, or a software program may be executed by one of the cores 802 or may be executed by multiple ones of the cores 802 at the same or different times. In some examples, the machine code corresponding to the firmware program, the embedded software program, or the software program is split into threads and executed in parallel by two or more of the cores 802. The software program may correspond to a portion or all of the machine readable instructions and/or operations represented by the flowchart of FIG. 6.

The cores 802 may communicate by a first example bus 804. In some examples, the first bus 804 may implement a communication bus to effectuate communication associated with one(s) of the cores 802. For example, the first bus 804 may implement at least one of an Inter-Integrated Circuit (I2C) bus, a Serial Peripheral Interface (SPI) bus, a PCI bus, or a PCIe bus. Additionally or alternatively, the first bus 804 may implement any other type of computing or electrical bus. The cores 802 may obtain data, instructions, and/or signals from one or more external devices by example interface circuitry 806. The cores 802 may output data, instructions, and/or signals to the one or more external devices by the interface circuitry 806. Although the cores 802 of this example include example local memory 820 (e.g., Level 1 (L1) cache that may be split into an L1 data cache and an L1 instruction cache), the microprocessor 800 also includes example shared memory 810 that may be shared by the cores (e.g., Level 2 (L2_cache)) for high-speed access to data and/or instructions. Data and/or instructions may be transferred (e.g., shared) by writing to and/or reading from the shared memory 810. The local memory 820 of each of the cores 802 and the shared memory 810 may be part of a hierarchy of storage devices including multiple levels of cache memory and the main memory (e.g., the main memory 714, 716 of FIG. 7). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 802 may be referred to as a CPU, DSP, GPU, etc., or any other type of hardware circuitry. Each core 802 includes control unit circuitry 814, arithmetic and logic (AL) circuitry (sometimes referred to as an ALU) 816, a plurality of registers 818, the L1 cache 820, and a second example bus 822. Other structures may be present. For example, each core 802 may include vector unit circuitry, single instruction multiple data (SIMD) unit circuitry, load/store unit (LSU) circuitry, branch/jump unit circuitry, floating-point unit (FPU) circuitry, etc. The control unit circuitry 814 includes semiconductor-based circuits structured to control (e.g., coordinate) data movement within the corresponding core 802. The AL circuitry 816 includes semiconductor-based circuits structured to perform one or more mathematic and/or logic operations on the data within the corresponding core 802. The AL circuitry 816 of some examples performs integer based operations. In other examples, the AL circuitry 816 also performs floating point operations. In yet other examples, the AL circuitry 816 may include first AL circuitry that performs integer based operations and second AL circuitry that performs floating point operations. In some examples, the AL circuitry 816 may be referred to as an Arithmetic Logic Unit (ALU). The registers 818 are semiconductor-based structures to store data and/or instructions such as results of one or more of the operations performed by the AL circuitry 816 of the corresponding core 802. For example, the registers 818 may include vector register(s), SIMD register(s), general purpose register(s), flag register(s), segment register(s), machine specific register(s), instruction pointer register(s), control register(s), debug register(s), memory management register(s), machine check register(s), etc. The registers 818 may be arranged in a bank as shown in FIG. 8. Alternatively, the registers 818 may be organized in any other arrangement, format, or structure including distributed throughout the core 802 to shorten access time. The second bus 822 may implement at least one of an I2C bus, a SPI bus, a PCI bus, or a PCIe bus Each core 802 and/or, more generally, the microprocessor 800 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 800 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 9:
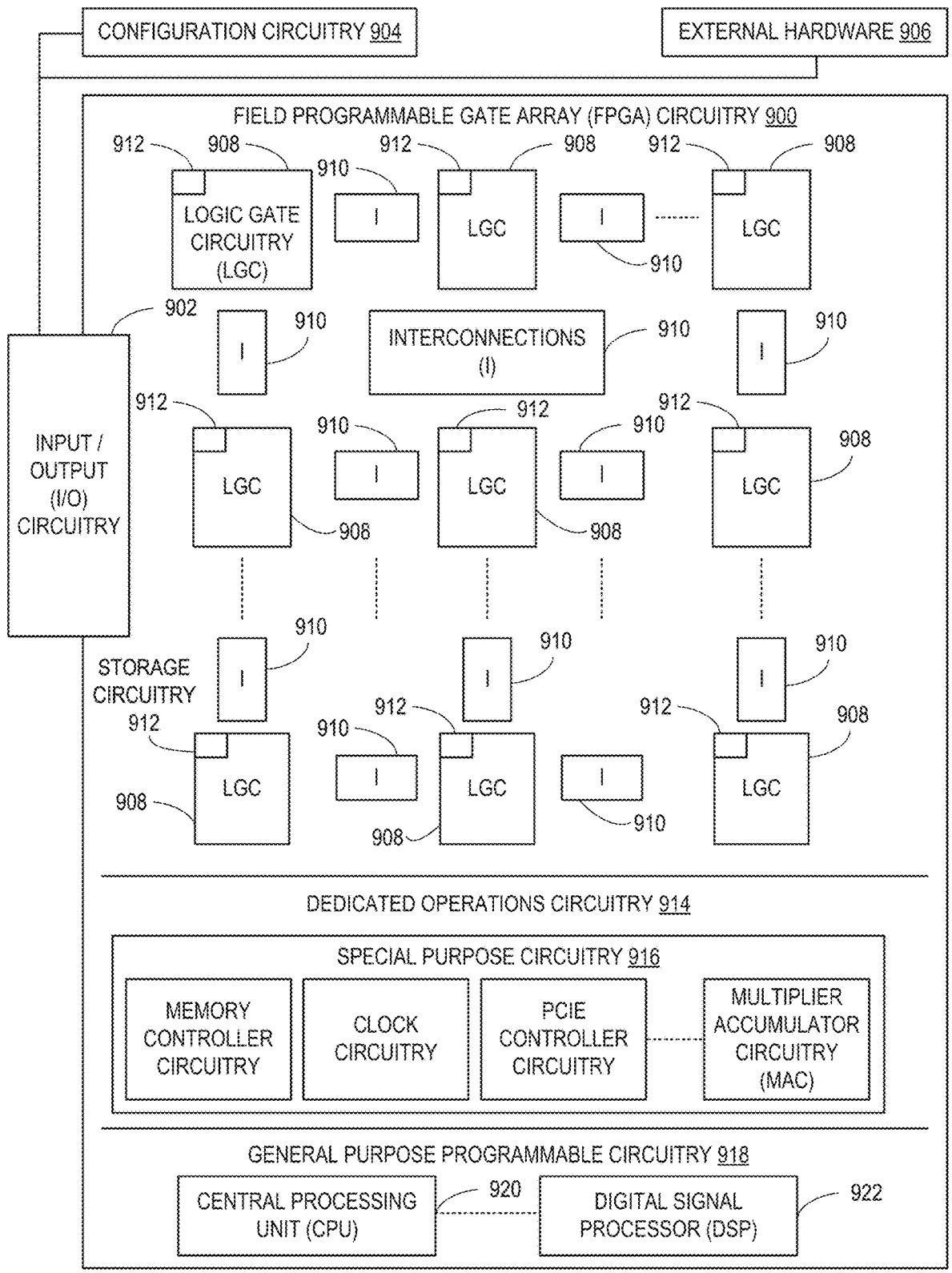
FIG. 9 is a block diagram of another example implementation of the processor circuitry of FIG. 7.

FIG. 9 is a block diagram of another example implementation of the processor circuitry 712 of FIG. 7. In this example, the processor circuitry 712 is implemented by FPGA circuitry 900. The FPGA circuitry 900 can be used, for example, to perform operations that could otherwise be performed by the example microprocessor 800 of FIG. 8 executing corresponding machine readable instructions. However, once configured, the FPGA circuitry 900 instantiates the machine readable instructions in hardware and, thus, can often execute the operations faster than they could be performed by a general purpose microprocessor executing the corresponding software.

More specifically, in contrast to the microprocessor 800 of FIG. 8 described above (which is a general purpose device that may be programmed to execute some or all of the machine readable instructions represented by the flowchart of FIG. 6 but whose interconnections and logic circuitry are fixed once fabricated), the FPGA circuitry 900 of the example of FIG. 9 includes interconnections and logic circuitry that may be configured and/or interconnected in different ways after fabrication to instantiate, for example, some or all of the machine readable instructions represented by the flowchart of FIG. 6. In particular, the FPGA 900 may be thought of as an array of logic gates, interconnections, and switches. The switches can be programmed to change how the logic gates are interconnected by the interconnections, effectively forming one or more dedicated logic circuits (unless and until the FPGA circuitry 900 is reprogrammed). The configured logic circuits enable the logic gates to cooperate in different ways to perform different operations on data received by input circuitry. Those operations may correspond to some or all of the software represented by the flowchart of FIG. 6. As such, the FPGA circuitry 900 may be structured to effectively instantiate some or all of the machine readable instructions of the flowchart of FIG. 6 as dedicated logic circuits to perform the operations corresponding to those software instructions in a dedicated manner analogous to an ASIC. Therefore, the FPGA circuitry 900 may perform the operations corresponding to the some or all of the machine readable instructions of FIG. 6 faster than the general purpose microprocessor can execute the same.

In the example of FIG. 9, the FPGA circuitry 900 is structured to be programmed (and/or reprogrammed one or more times) by an end user by a hardware description language (HDL) such as Verilog. The FPGA circuitry 900 of FIG. 9, includes example input/output (I/O) circuitry 902 to obtain and/or output data to/from example configuration circuitry 904 and/or external hardware (e.g., external hardware circuitry) 906. For example, the configuration circuitry 904 may implement interface circuitry that may obtain machine readable instructions to configure the FPGA circuitry 900, or portion(s) thereof. In some such examples, the configuration circuitry 904 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 906 may implement the microprocessor 800 of FIG. 8. The FPGA circuitry 900 also includes an array of example logic gate circuitry 908, a plurality of example configurable interconnections 910, and example storage circuitry 912. The logic gate circuitry 908 and interconnections 910 are configurable to instantiate one or more operations that may correspond to at least some of the machine readable instructions of FIG. 6 and/or other desired operations. The logic gate circuitry 908 shown in FIG. 9 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 908 to enable configuration of the electrical structures and/or the logic gates to form circuits to perform desired operations. The logic gate circuitry 908 may include other electrical structures such as look-up tables (LUTs), registers (e.g., flip-flops or latches), multiplexers, etc.

The interconnections 910 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 908 to program desired logic circuits.

The storage circuitry 912 of the illustrated example is structured to store result(s) of the one or more of the operations performed by corresponding logic gates. The storage circuitry 912 may be implemented by registers or the like. In the illustrated example, the storage circuitry 912 is distributed amongst the logic gate circuitry 908 to facilitate access and increase execution speed.

The example FPGA circuitry 900 of FIG. 9 also includes example Dedicated Operations Circuitry 914. In this example, the Dedicated Operations Circuitry 914 includes special purpose circuitry 916 that may be invoked to implement commonly used functions to avoid the need to program those functions in the field. Examples of such special purpose circuitry 916 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 900 may also include example general purpose programmable circuitry 918 such as an example CPU 920 and/or an example DSP 922. Other general purpose programmable circuitry 918 may additionally or alternatively be present such as a GPU, an XPU, etc., that can be programmed to perform other operations.

Although FIGS. 8 and 9 illustrate two example implementations of the processor circuitry 712 of FIG. 7, many other approaches are contemplated. For example, as mentioned above, modern FPGA circuitry may include an on-board CPU, such as one or more of the example CPU 920 of FIG. 9. Therefore, the processor circuitry 712 of FIG. 7 may additionally be implemented by combining the example microprocessor 800 of FIG. 8 and the example FPGA circuitry 900 of FIG. 9. In some such hybrid examples, a first portion of the machine readable instructions represented by the flowchart of FIG. 6 may be executed by one or more of the cores 802 of FIG. 8, a second portion of the machine readable instructions represented by the flowchart of FIG. 6 may be executed by the FPGA circuitry 900 of FIG. 9, and/or a third portion of the machine readable instructions represented by the flowchart of FIG. 6 may be executed by an ASIC. It should be understood that some or all of the circuitry of FIG. 5 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuitry 712 of FIG. 7 may be in one or more packages. For example, the processor circuitry 800 of FIG. 8 and/or the FPGA circuitry 900 of FIG. 9 may be in one or more packages. In some examples, an XPU may be implemented by the processor circuitry 712 of FIG. 7, which may be in one or more packages. For example, the XPU may include a CPU in one package, a DSP in another package, a GPU in yet another package, and an FPGA in still yet another package.

Example methods, apparatus, systems, and articles of manufacture to enable aircraft recovery systems that can quickly and easily recover aircraft are disclosed herein. Further examples and combinations thereof include the following:

Example 1 includes an apparatus for recovering an unmanned aerial vehicle (UAV), the apparatus comprising a base to be mounted to a recovery vehicle, a flexible arm extending from the base to pivot therefrom, the arm having a first end at the base and a second end opposite the first end, the arm to move to counteract a movement of the recovery vehicle, and a coupler mounted on or proximate the second end of the arm, the coupler to be releasably coupled to the UAV.

Example 2 includes the apparatus as defined in example 1, further including a sensor to measure the movement of the recovery vehicle.

Example 3 includes the apparatus as defined in example 2, further including an actuator to control movement of the arm based on the measured movement of the recovery vehicle.

Example 4 includes the apparatus as defined in example 3, further including at least one memory, instructions, and processor circuitry to execute the instructions to calculate a counteracting movement of the arm based on the measured movement, and control the actuator to move the arm based on the counteracting movement.

Example 5 includes the apparatus as defined in any of examples 1 to 4, wherein the arm is telescoping such that the arm can expand and contract longitudinally.

Example 6 includes the apparatus as defined in example 5, wherein the coupler includes a magnet, and wherein the arm is to be expanded longitudinally to bring the magnet in proximity of the UAV to attract the UAV.

Example 7 includes the apparatus as defined in any of examples 1 to 6, wherein the coupler includes a lock to secure the coupler to the UAV, the lock to push the UAV away during launch of the UAV.

Example 8 includes the apparatus as defined in any of examples 1 to 7, wherein the UAV is a vertical takeoff and landing (VTOL) aircraft or a short takeoff and landing (STOL) aircraft.

Example 9 includes a method of recovering an unmanned aerial vehicle (UAV), the method comprising moving, in response to a movement of a recovery vehicle, an arm that pivots from a base of a recovery vehicle to counteract the movement of the recovery vehicle, the arm having a distal end supporting a first coupler, and extending the arm toward the UAV as the UAV hovers to bring the first coupler in proximity of a second coupler carried by the UAV, the first coupler to be coupled to the second coupler to couple the UAV to the arm.

Example 10 includes the method as defined in example 9, further including measuring, with a sensor, the movement of the recovery vehicle.

Example 11 includes the method as defined in example 10, further including calculating, by executing instructions with at least one processor, a counteracting movement of the arm based on the measured movement of the recovery vehicle.

Example 12 includes the method as defined in example 11, further including controlling, by executing instructions with the at least one processor, an actuator operatively coupled to the arm based on the counteracting movement.

Example 13 includes the method as defined in example 12, wherein the counteracting movement of the arm is at least partially based on wind conditions proximate the UAV.

Example 14 includes the method as defined in any of examples 10 to 13, wherein the recovery vehicle is a marine vessel, and wherein measuring the movement of the recovery vehicle includes measuring a movement of fluid on which the marine vessel floats.

Example 15 includes a non-transitory computer readable medium comprising instructions, which when executed, cause processor circuitry to determine a movement of a recovery vehicle carrying an arm for recovery of an unmanned aerial vehicle (UAV), the arm to pivot relative to the recovery vehicle, calculate a counteracting movement of the arm based on the determined movement of the recovery vehicle, and control an actuator to move the arm based on the counteracting movement to bring a first coupler of the arm to a second coupler of the UAV to capture the UAV.

Example 16 includes the non-transitory computer readable medium as defined in example 15, wherein the movement of the recovery vehicle is determined based on output from a sensor of the recovery vehicle.

Example 17 includes the non-transitory computer readable medium as defined in any of examples 15 or 16, wherein the recovery vehicle is a marine vessel, and wherein the determination of the movement of the recovery vehicle is at least partially based on measuring a movement of fluid on which the marine vessel floats.

Example 18 includes the non-transitory computer readable medium as defined in any of examples 15 to 17, wherein the actuator is controlled at least partially based on a wind condition proximate the UAV.

Example 19 includes the non-transitory computer readable medium as defined in example 18, wherein the calculation of the counteracting movement of the arm is at least partially based on the wind condition.

Example 20 includes the non-transitory computer readable medium as defined in any of examples 15 to 19, wherein the instructions further cause the processor circuitry to direct the UAV to hover proximate the first coupler of the arm.

From the foregoing, it will be appreciated that example systems, methods, apparatus, and articles of manufacture have been disclosed that enable lightweight and compact launch/recovery of UAVs that adjusts for motion of a recovery vehicle. As a result, examples disclosed herein can enable quick recovery of UAVs, thereby saving fuel usually necessitated in extended duration landing and/or recovery attempts. Further, examples disclosed herein can be implemented for recovery of VTOL and STOL aircraft, which can be generally imprecise when hovering. Additionally, examples disclosed herein can accommodate for motion of recovery vehicles, wind conditions and/or thrust generated by aircraft being recovered.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus for recovering an aerial vehicle (AV), the apparatus comprising:
   a base to be mounted to a recovery vehicle;
   a flexible arm extending from the base to pivot therefrom, the arm having a first end at the base and a second end opposite the first end, the arm to move to counteract a movement of the recovery vehicle;
   a coupler mounted on or proximate the second end of the arm, the coupler to be releasably coupled to the AV;
   a sensor to measure a movement of the AV; and
   an actuator operatively coupled to the arm, the actuator to control a sway of the arm based on the movement of the AV.

2. The apparatus as defined in claim 1, further including a second sensor to measure the movement of the recovery vehicle.

3. The apparatus as defined in claim 2, wherein the actuator is to control movement of the arm further based on the measured movement of the recovery vehicle.

4. The apparatus as defined in claim 3, further including:
   at least one memory;

instructions; and processor circuitry to execute the instructions to:
calculate a counteracting movement of the arm based on the measured movement, wherein the actuator to move the arm is controlled further based on the counteracting movement.

5. The apparatus as defined in claim 1, wherein the arm is telescoping such that the arm can expand and contract longitudinally.

6. The apparatus as defined in claim 5, wherein the coupler includes a magnet, and wherein the arm is to be expanded longitudinally to bring the magnet in proximity of the AV to attract the AV.

7. The apparatus as defined in claim 1, wherein the coupler includes a lock to secure the coupler to the AV, the lock to push the AV away during launch of the AV.

8. The apparatus as defined in claim 1, wherein the AV is a vertical takeoff and landing (VTOL) aircraft or a short takeoff and landing (STOL) aircraft.

9. The apparatus as defined in claim 1, wherein the sway of the arm corresponds to an elastic flexure of the arm.

10. A method of recovering an aerial vehicle (AV), the method comprising:
moving, in response to a movement of a recovery vehicle, an arm that pivots from a base of the recovery vehicle to counteract the movement of the recovery vehicle, the arm having a distal end supporting a first coupler;
extending the arm toward the AV as the AV hovers to bring the first coupler in proximity of a second coupler carried by the AV, the first coupler to be coupled to the second coupler to couple the AV to the arm;
measuring, with a sensor, the movement of the AV; and
controlling, based on movement of the AV, a sway of the arm via an actuator operatively coupled to the arm.

11. The method as defined in claim 10, further including measuring, with a second sensor, the movement of the recovery vehicle.

12. The method as defined in claim 11, further including calculating, by executing instructions with at least one processor, a counteracting movement of the arm based on the measured movement of the recovery vehicle.

13. The method as defined in claim 12, wherein the actuator operatively coupled to the arm is controlled further based on the counteracting movement.

14. The method as defined in claim 13, wherein the counteracting movement of the arm is at least partially based on wind conditions proximate the AV.

15. The method as defined in claim 11, wherein the recovery vehicle is a marine vessel, and wherein measuring the movement of the recovery vehicle includes measuring a movement of fluid on which the marine vessel floats.

16. A non-transitory computer readable medium comprising instructions, which when executed, cause processor circuitry to:
determine a movement of a recovery vehicle carrying an arm for recovery of an aerial vehicle (AV), the arm to pivot relative to the recovery vehicle;
determine a movement of the AV;
calculate a counteracting movement of the arm based on the determined movement of the recovery vehicle and the determined movement of the AV; and
direct an actuator to control a sway of the arm based on the counteracting movement to bring a first coupler of the arm to a second coupler of the AV to capture the AV.

17. The non-transitory computer readable medium as defined in claim 16, wherein the movement of the recovery vehicle is determined based on output from a sensor of the recovery vehicle.

18. The non-transitory computer readable medium as defined in claim 16, wherein the recovery vehicle is a marine vessel, and wherein the determination of the movement of the recovery vehicle is at least partially based on measuring a movement of fluid on which the marine vessel floats.

19. The non-transitory computer readable medium as defined in claim 16, wherein the actuator is controlled at least partially based on a wind condition proximate the AV.

20. The non-transitory computer readable medium as defined in claim 19, wherein the calculation of the counteracting movement of the arm is at least partially based on the wind condition.

21. The non-transitory computer readable medium as defined in claim 16, wherein the instructions further cause the processor circuitry to direct the AV to hover proximate the first coupler of the arm.

* * * * *